United States Patent [19]

Hynes et al.

[11] Patent Number: 5,161,828
[45] Date of Patent: Nov. 10, 1992

[54] BREAK-AWAY FLOWLINE FITTING

[75] Inventors: Joseph H. Hynes; James H. Owens, III, both of Houston, Tex.

[73] Assignee: Cooper Industries, Inc., Houston, Tex.

[21] Appl. No.: 738,525

[22] Filed: Jul. 31, 1991

[51] Int. Cl.⁵ .............................................. F16L 35/00
[52] U.S. Cl. ...................................... 285/2; 166/347; 285/114; 285/4
[58] Field of Search ....................... 285/1, 2, 3, 4, 114, 285/115; 166/55, 340, 363, 364, 365, 347

[56] References Cited

U.S. PATENT DOCUMENTS

| | | | |
|---|---|---|---|
| 1,814,800 | 7/1931 | Heeter | 285/2 |
| 2,305,377 | 12/1942 | Corey . | |
| 3,252,192 | 5/1966 | Smith | 285/114 |
| 3,387,863 | 6/1968 | Treese | 285/2 |
| 3,502,353 | 3/1970 | Burns . | |
| 3,659,877 | 5/1972 | Kubasta | 285/3 |
| 3,727,948 | 4/1973 | Current . | |
| 4,059,288 | 11/1977 | Mohr | 285/2 |
| 4,130,161 | 12/1978 | Jones | 166/363 |
| 4,361,165 | 11/1982 | Flory | 285/2 |
| 4,652,016 | 3/1987 | Bormioli | 285/2 |
| 4,688,827 | 8/1987 | Bassett | 285/2 |

Primary Examiner—Eric K. Nicholson
Attorney, Agent, or Firm—William E. Shull; David A. Rose; Bruce Patterson

[57] ABSTRACT

A break-away flowline fitting for protecting a subsea Christmas tree to which the flowlines are connected when the flowlines are subjected to an externally applied axial load and/or bending moment. The fitting comprises a tubular member having a reduced wall thickness section integrally formed in the member and designed to part or separate axially at an externally applied load less than what would be necessary to harm the tree. A clamp closely surrounds the reduced wall thickness section and limits the pressure induced hoop membrane stress in the reduced wall thickness section to about the same value as in the adjacent normally configured fitting portions, thereby maintaining the pressure integrity of the fitting. A frame having supports disposed on the normally configured fitting portions and axially beyond each end of the reduced wall thickness section has removable reinforcing members which span the reduced wall thickness section prior to placing the fitting in service. The reinforcing members provide temporary support for the reduced wall thickness section and prevent its being damaged in transit or during installation, and are removed after the fitting is installed and ready for service. The fitting will then be "armed" and ready to part axially at the reduced level of externally applied load.

10 Claims, 2 Drawing Sheets

BREAK-AWAY FLOWLINE FITTING

BACKGROUND OF THE INVENTION

The present invention relates to the field of oil and gas production methods and apparatus, and more particularly to the field of flowlines used in the production of oil and gas from offshore locations. More particularly still, the present invention relates to the field of break-away flowline fittings for protecting subsea Christmas trees or other equipment to which the flowlines are connected when the flowlines are subjected to an externally applied axial load and/or bending moment.

In the production of oil and gas from offshore locations, flowlines which run over or along the sea floor, such as the flowlines running from the Christmas tree of a subsea satellite well to a remote production platform or the like, are sometimes subjected to extreme externally applied axial loads or bending moments from encounters with ships' anchors, ensnarement in fishermen's nets, or encounters with other subsea hazards. It is possible for such external axial loads or bending moments to be great enough to topple or cant the wellhead and Christmas tree of such a subsea well before the flowline breaks, which of course can cause severe damage to the installation and can even result in a blowout or other catastrophic occurrence. Subsea trees are typically provided with "fail-safe" valves which would close and shut in the well if the flowline were severed. If the trees or other components are pulled over and sufficiently damaged, however, such fail-safe valves may themselves be damaged or disabled to the extent that they are unable to operate.

The danger of toppling, canting, or otherwise damaging the Christmas trees and other wellhead components before the flowlines break, when the flowlines are subjected to such an external axial load or bending moment, arises because subsea flowlines must be designed to accommodate the high hoop stresses caused by the internal fluid pressures encountered in service. From traditional stress analysis of long, thin walled tubes subjected to internal pressure, it is known that these hoop stresses are twice the axial stresses resulting from those same internal fluid pressures. Thus, in selecting the wall thickness of a pipe to be used as a flowline subjected to internal pressure, the hoop stress will determine the minimum serviceable wall thickness. The flowline wall thickness necessary to accommodate these high hoop stresses and contain the internal fluid pressures without bursting typically results in flowlines which are so strong in tension and/or bending that such flowline strength exceeds the strength or capacity of the wellhead and Christmas tree to withstand, without damage, those same external axial loads or bending moments. Thus, when dragged by a ship's anchor, for example, if the flowline breaks at all, it may well be after costly or even irreparable damage to the tree and wellhead has occurred. Even worse, as stated above it may well be after the operators have a catastrophe on their hands, such as a blowout.

Various devices have been proposed in the past to cause the axial separation of a fluid-carrying conduit at a predetermined external axial load and/or bending moment, below that required for tensile failure of the conduit material. For example, a separable and at least partially pressure balanced safety pipeline connector or joint is disclosed in U.S. Pat. No. 4,059,288, issued Nov. 22, 1977, to Harvey O. Mohr. The connector of the Mohr patent has a weak point causing it to separate at a predetermined tension load and is designed to be substantially insensitive to operating line pressure. The connector includes a housing having one axial end adapted for connection to the pipeline and an open opposite end. A pipe extension member has one end adapted for connection to the pipeline and another end adapted for telescoping, sealed insertion into the open end of the housing. A shear disk is mounted between the extension member and the housing and is designed to shear when the axial load reaches a predetermined level, permitting axial separation of the housing and extension member at loads above said predetermined level and preventing such separation at loads below said level. The housing and extension member are arranged to provide an annular chamber between them whereby fluid pressure in the chamber urges the housing and extension members axially together to balance line pressure. A port is provided through the extension member to communicate line pressure to the chamber.

U.S. Pat. No. 4,361,165, issued Nov. 30, 1982, to John F. Flory, discloses a break-away pipeline coupling with associated valves which automatically close when the pipeline separates in order to stop the flow of fluids from the pipeline. The separation of the coupling occurs as shear pins or shear studs disposed between the coupling sections fail when the coupling is subjected to an external tensile force exceeding a predetermined level. A plurality of piston and cylinder pressure compensating devices are arranged around the exterior of the coupling sections to hold them together until separation. The pressure compensating devices apply a compression load on the coupling to counteract the tension load exerted by internal pipeline pressure. The pistons move axially within cylinders in response to pressure differentials, and ports or tubing expose one side of the pistons to the internal pipeline pressure. When internal pressure produces a force which tends to separate the coupling, an opposing compressive force resulting from the pressure acting on the pistons tends to hold the coupling together. External tensile force tending to separate the coupling is resisted by the shear pins, but when a predetermined maximum external tensile force is exceeded, the shear pins fail and the coupling sections will separate.

Another example of a safety joint proposed in the past to provide a controlled weakness in a pipeline is set out in U.S. Pat. No. 4,688,827, issued Aug. 25, 1987, to Max Bassett. The Bassett joint includes a pair of tubular mandrels connectable to opposing pipe ends. A portion of the first mandrel is insertable in a part of the other mandrel, and a latch mechanism is provided between them to hold them against axial separation. A retaining shoulder on the first mandrel retains the latch in engagement and a sealing ring is disposed between the mandrels to seal them together. A fluid-tight pressure compensation chamber surrounds the portion of the first mandrel received in the second mandrel and communicates through a fluid passage with the interior of the mandrel. The seal and its associated pressure compensation chamber are sized whereby forces tending to separate the mandrels are substantially equalized by the fluid pressure in the chamber. Frangible members normally hold the two mandrels together but break when a predetermined axial load is applied, the pressure compensation chamber being axially crushable when the frangible members break, thereby allowing the limited axial movement between the mandrels. The mandrels are allowed to move axially a sufficient distance to permit the retaining shoulder to move axially to release the latch mechanism, thereby allowing the mandrels to disengage from one another.

Yet another example of a safety joint previously proposed to provide a controlled weakness in a pipeline is set out in U.S. Pat. No. 3,659,877, issued May 2, 1972, to James W. Kubasta. The Kubasta device comprises a pair of telescopingly engaged upper and lower tubular coupling members including a pair of flanges surrounding the members for holding them in fixed relationship, one flange being secured to the upper coupling member and a split flange surrounding but not secured to the lower coupling member. Frangible bolts secure the upper flange portion to the split flange with the split flange adapted to separate when excessive axial force is placed on the coupling and breaks the frangible bolts. A seal means, such as a plurality of spacers or packing rings, is disposed between the coupling members to provide a fluid tight seal between them.

While one or more of the above-described prior art devices may have met with some degree of acceptance in some circles of the offshore oil and gas industry, all of them suffer from the same primary drawback: they are all relatively complicated devices with a multiplicity of interfitting parts or components, thus necessitating relatively complex and expensive manufacturing processes. Moreover, at least the Mohr and Flory devices have internal moving parts, thereby particularly leaving them open to the possibility of failure, especially after long periods of exposure to the corrosive effects of sea water or the other usual hazards of the typical subsea environment. Moreover, all of these prior art devices include one or more seals for permitting the respective break-away devices to serve as part of a fluid-carrying conduit. This opens each of these devices to the possibility of seal failure, which again becomes more likely after the devices have remained on the sea floor for an extended period of time exposed to the harsh subsea environment, and which in turn would require potentially costly or time-consuming repair or replacement of the break-away devices. Accordingly, these prior art devices have not adequately solved the problems referred to above with respect to the need for a break-away flowline fitting to protect a subsea Christmas tree or the like from excessive externally applied axial loads and/or bending moments.

Other examples of releasable tubing or pipe string couplings designed for use in the oil and gas industry, particularly for strings of pipe used in a well bore, are shown in U.S. Pat. No. 3,727,948, issued Apr. 17, 1973, to James H. Current, and U.S. Pat. No. 3,502,353, issued Mar. 24, 1970, to Erwin Burns. These patents each disclose use of frangible means such as shear pins or shear studs to maintain upper and lower sections of pipe or tubing together, and they each require a seal between the sections to permit the couplings to carry fluid without leaking. Thus, these devices would also be unsuitable for a break-away flowline fitting for subsea use.

Frangible bolts disposed in an annular gasket-like member between upper and lower flanged structures, which bolts shear to permit the upper structure, such as a fire hydrant or light pole, to separate from or cant with respect to the lower supporting structure, are disclosed in U.S. Pat. No. 2,305,377, issued Dec. 15, 1942, to William W. Corey. Such a frangible bolt and gasket device for a fluid-carrying conduit would also require the use of seals between the flanges of the connecting structures, and again, for this reason would be unsuitable for subsea use for a break-away flowline fitting.

SUMMARY OF THE INVENTION

The present invention comprises a break-away fitting for use in a subsea flowline near the Christmas tree of a subsea well for protecting the tree from excessive tension loads and/or bending moments applied externally from a location outboard of the fitting such as, for example, might be applied by a ship's anchor, fishermen's nets, or the like. The fitting comprises a reduced wall thickness tubing section located in the flowline closely adjacent to the wellhead, and a small clamp surrounding the reduced wall thickness section. The section of reduced wall thickness is disposed at a radial location in the wall of the fitting such that pressure end load on the fitting will not create circumferential bending moments at the reduced wall thickness section which could tend to weaken the fitting. For a fitting which may be called a "thin-walled tube," that is, a fitting with a wall thickness that is small compared to its mean diameter, the mean radius of the reduced wall thickness section may be substantially the same as the mean radius of the adjacent, non-reduced wall thickness, that is, normally configured, fitting portions. That is, for a fitting which is also a thin-walled tube, the same thickness of material may be, in effect, removed from both the outside diameter ("OD") and the inside diameter ("ID") of the fitting in order to obtain the reduced wall thickness section.

The section of reduced wall thickness is sized such that a predetermined axial load and/or bending moment, well below that required for axial separation due to failure of the normally configured fitting portions, will cause the reduced wall thickness section to fail in tension, and thus will cause the fitting to part at the reduced wall thickness section. That is, the reduced wall thickness is sized such that the sum of axial membrane stress induced by pressure end load plus the axial membrane stress induced by an external axial force and/or bending moment of the predetermined low level will bring the total axial membrane stress in the reduced wall thickness section to the ultimate strength of the metal or other material of which the fitting is made. The fitting separates at the reduced wall thickness at this predetermined, relatively low level of axial load.

In order to maintain the pressure integrity of the fitting in the reduced wall thickness section, the clamp which surrounds the reduced wall thickness section limits the pressure induced hoop stress in the reduced wall thickness section to approximately the same magnitude as in the adjacent normally configured portions. The clamp preferably fits snugly around the circumference of the reduced wall thickness portion, being sized generally and preferably with a slight radial clearance between the ID of the clamp and the OD of the reduced wall thickness portion when the flowline is in an unpressured state. Thus, preferably the clamp does not provide any substantial preload on the reduced wall thickness section, but is preferably designed to provide a uniform circumferential loading around the reduced wall thickness section when the flowline is placed in service. In practice, the fit of the clamp on the reduced wall thickness section, i.e., the relative dimensions of the two members, may depend on such variables, among others, as the stiffness of the clamp, the sizes of the members, and the materials of which they are made. Accordingly, in any particular case the dimensions and fit of the clamp and reduced wall thickness section may be varied from the preferred embodiment described herein, so long as the desired result of effectively limiting the pressure induced hoop stress in the reduced wall thickness section to approximately the same magnitude as in the normally configured portions is achieved.

There is a gradually tapered or frustoconical transition surface between the normally configured and reduced wall thickness portions on both the OD and the ID of the fitting, on both ends of the reduced wall thickness section, that is, on the end toward the Christmas tree and on the end toward the remainder of the flowline. The transition surfaces between the gradually tapered portions and the reduced wall thickness section comprise small radii. The axial length of the clamp covers approximately the distance between the tangent points between the small radius surfaces and the reduced wall thickness section.

The fitting of the present invention includes a frame with supports disposed on opposite sides of the reduced wall thickness section with reinforcing members connected between the supports prior to placing the fitting in service. The reinforcing members provide additional, temporary structural support for the reduced wall thickness section, and prevent the reduced wall thickness section of the fitting from being damaged during transit or installation. The supports are removed after installing the fitting in the flowline and prior to placing the fitting in service, thereby "arming" the fitting to separate at the predetermined externally applied axial load. The fitting may be, for example, butt welded on its opposite ends to the Christmas tree and the remaining flowline portion.

The break-away flowline fitting of the present invention will separate axially, at the reduced wall thickness section, at a much lower externally applied axial load and/or bending moment than what would otherwise be required to break the fitting at its normally configured portions, such lower externally applied axial load and/or bending moment being less than what would be necessary to harm or topple the Christmas tree and other wellhead components. Thus, the tree is protected from being pulled over or damaged by such externally applied loads.

The break-away fitting of the present invention is extremely simple to make and use, and consequently very economical. The fitting of the present invention is also very reliable and durable, accomplishing its intended purpose with no seals or moving parts.

These and other objects and advantages of the invention will become apparent from the following description of the preferred embodiment when read in conjunction with reference to the following drawings, wherein:

DESCRIPTION OF THE PREFERRED EMBODIMENT

Figure 1:
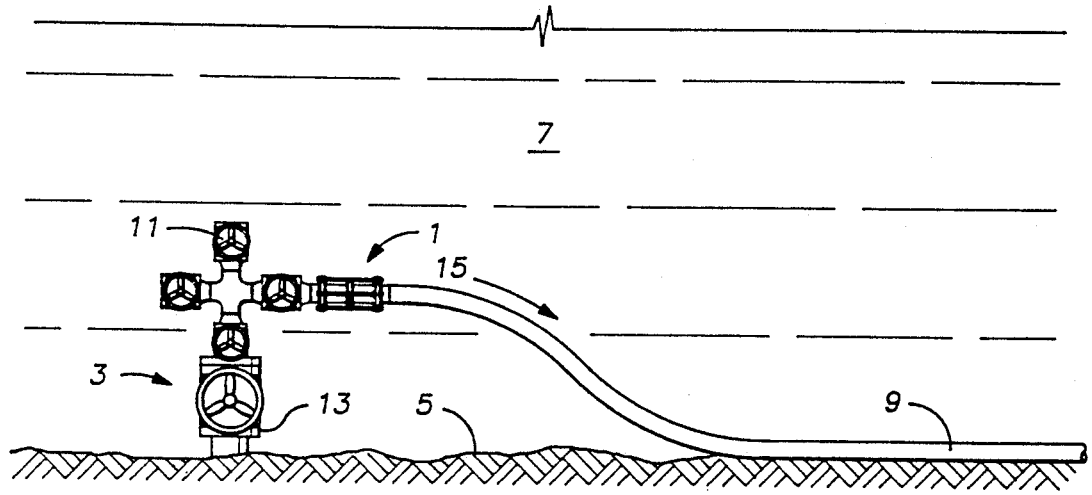
FIG. 1 is a schematic representation of a typical environment in which the break-away fitting of the present invention will be found useful.

Referring to FIG. 1, there is shown a schematic representation of the general environment in which the break-away flowline fitting of the present invention, indicated generally at 1, will be found useful. A subsea, satellite oil and/or gas well 3 is disposed at the bottom 5 of a body of water 7, and a flowline 9 extends along the sea floor from a Christmas tree 11 disposed at the top of the wellhead 13 of the well 3. The flowline 9 may comprise a steel pipe such as is typically used in offshore locations, or it may comprise one of the flexible types of flowline materials such as are used from time to time, particularly for deep water wells. The fitting 1 of the present invention is preferably integrally disposed in the flowline 9 closely adjacent to, and may be attached directly to, the Christmas tree 11. The fitting 1 of the present invention is adapted for parting or separating axially, due to failure in tension, when subjected to excessive external axial loads and/or bending moments applied from a location, indicated generally by arrow 15, outboard of the fitting.

Figure 2:
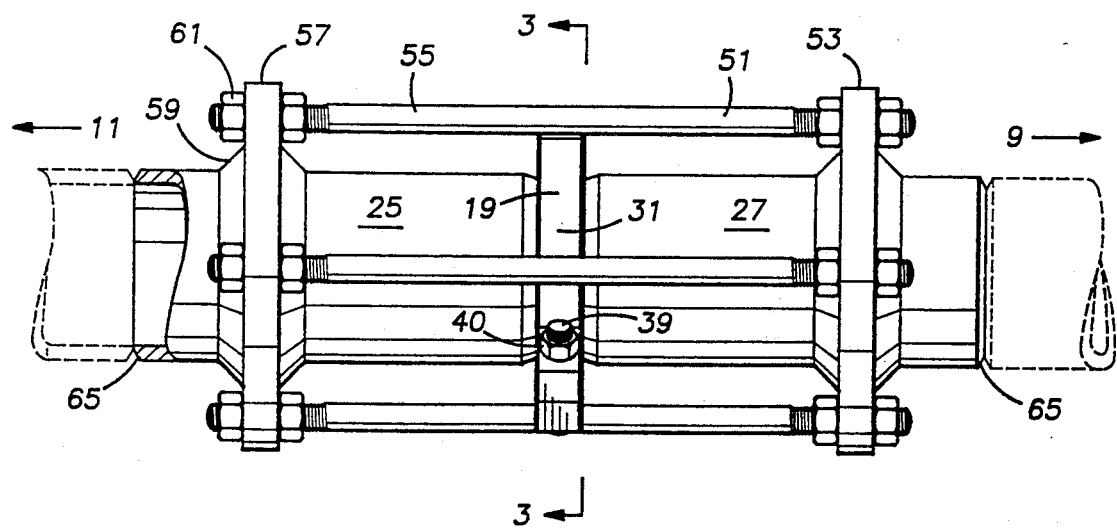
FIG. 2 is an elevational view showing one preferred embodiment of the break-away fitting of the present invention.
Figure 3:
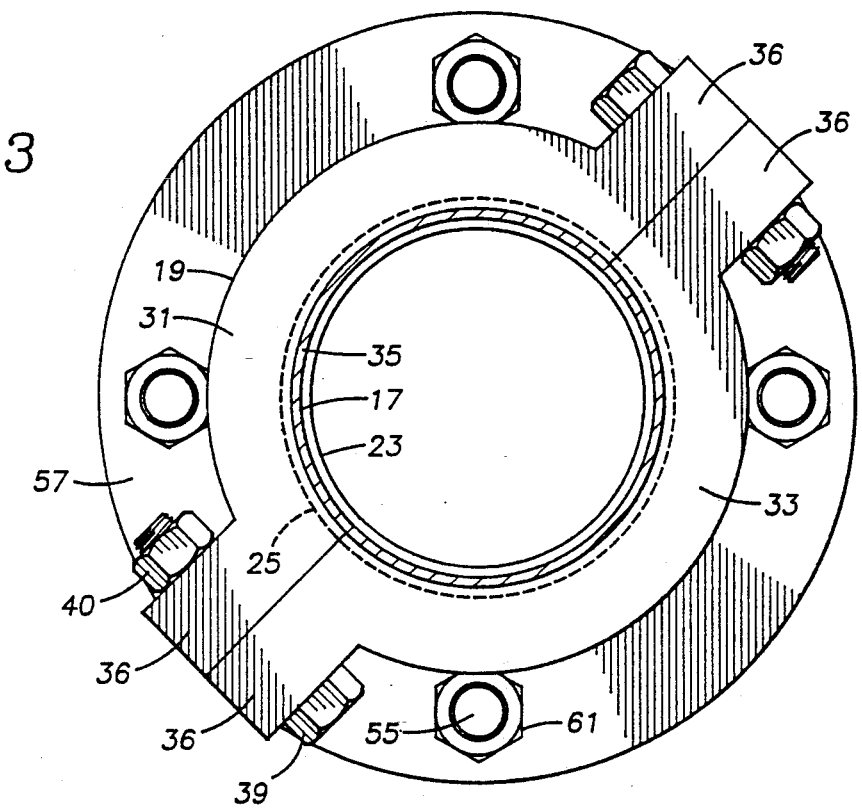
FIG. 3 is a vertical, transverse sectional view of the fitting of the present invention shown in FIG. 2, taken along section lines 3—3 of FIG. 2.
Figure 4:
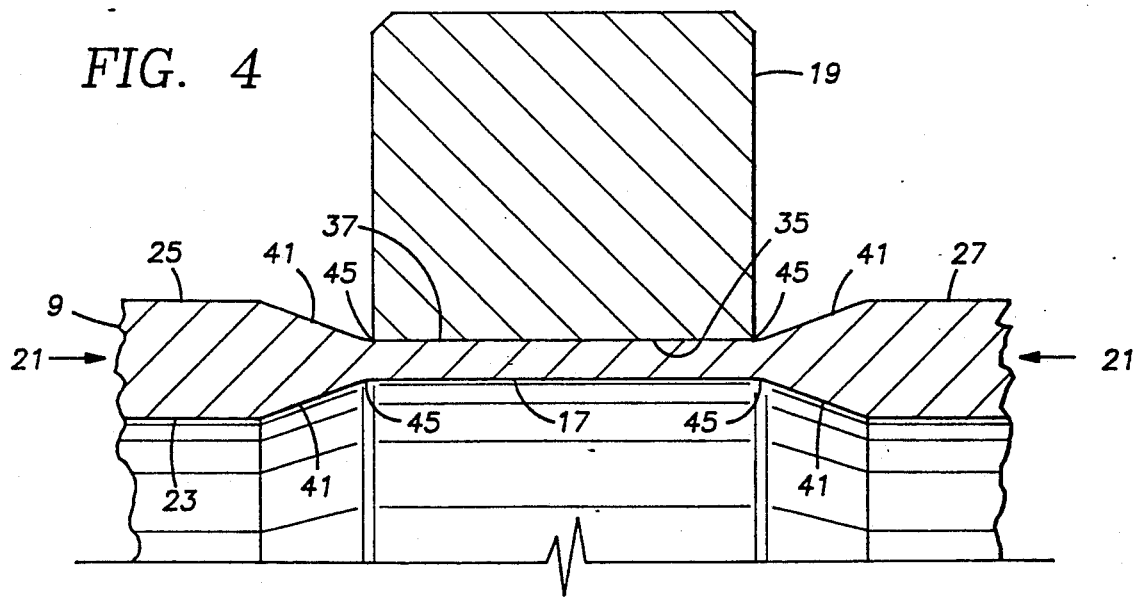
FIG. 4 is a vertical, fragmentary, longitudinal axial sectional view of the reduced wall thickness portion and clamp of the fitting of FIG. 2

Referring to FIGS. 2, 3, and 4, the fitting 1 of the present invention comprises a reduced wall thickness tubing section 17 disposed in its midportion and a small clamp 19 surrounding the reduced wall thickness section. The section 17 of reduced wall thickness is disposed in a radial location in the wall 23 of fitting 1 such that pressure end load on the fitting will be balanced across the entire cross section of the fitting, both radially outwardly and radially inwardly of the reduced wall thickness section. This is for the purpose of ensuring that there will be substantially no tendency for the creation of circumferential bending moments at the reduced wall thickness section on account of pressure end load, which circumferential bending moments could otherwise tend to weaken the fitting. For fittings which may aptly be referred to as comprising thin-walled tubes, the reduced wall thickness section 17 may be at or near the radial center, indicated generally by arrows 21, of the wall 23 of fitting 1 such that the mean radius of the reduced wall thickness section may be the same as the mean radius of the adjacent normally configured wall portions 25, 27 on the opposite ends of the reduced wall thickness section 17. In other words, the radial distance between the OD of the reduced wall thickness section 17 and the OD of the non-reduced or normally configured wall portions 25, 27 may preferably be the same as the radial distance between the ID of the reduced wall thickness section 17 and the ID of the non-reduced or normally configured wall portions 25, 27. In effect, if the fitting 1 were originally to comprise simply a thin-walled length of pipe having a uniform OD and ID equal to those of the normally configured portions 25, 27, then the same thickness of metal (or other material) would preferably be removed from the OD and the ID of the fitting in order to obtain the reduced wall thickness section 17.

The section 17 of reduced wall thickness is sized such that a predetermined external axial load and/or bending moment, well below that required for axial separation due to failure of the normally configured fitting portions 25, 27, will cause the reduced wall thickness section 17 to fail in tension, and thus will cause the fitting 1 to part at the reduced wall thickness section 17. That is, the reduced wall thickness section 17 is sized such that the sum of the axial membrane stress induced by pressure end load in flowline 9, plus the axial membrane stress induced by an external axial force and/or bending moment of the predetermined low level, will bring the total axial membrane stress in the reduced wall thickness section 17 to the ultimate strength of the metal or other material of which the fitting is made. The fitting separates at the reduced wall thickness at this predetermined, relatively low level of external axial force and/or bending moment.

As an example only, and not by way of limitation, the sizing of reduced wall thickness section 17 may proceed along the following lines. It will be understood by those skilled in the art of underwater oil and/or gas production and conveying, and particularly in the design of underwater flowlines, that the size and location of reduced wall thickness section 17 at or near the mean radius of the fitting, or at some other radial location (the flowline can be either a thin-walled or non-thin-walled pipe), in any particular case will depend on such factors as the pressure to be carried in the flowline, the size of the flowline, the material of which the flowline is made, and the desired external axial load and/or bending moment at which the fitting is to separate. In view of the foregoing, the following discussion is intended to serve as an example of one approach to the sizing of reduced wall thickness section 17 under one particular set of assumptions.

For the purposes of this example, it is assumed that a flowline 9 comprises a long, right circular cylindrical, steel pipe with a generally uniform wall thickness that is small compared to its mean diameter. In other words, for the purposes of this example, flowline 9 and fitting 1 are assumed to comprise thinwalled tubes. Flowline 9 is first assumed to have an OD of 6.625 inches, an ID of 5.625 inches, and a wall thickness of 0.5 inches, which dimensions are typical of subsea flowlines. Fluid inside the pipe is assumed to be at a pressure of 5,000 psi. The yield point of the steel in flowline 9, $\sigma_y$, is assumed to be 35,000 psi, and the ultimate strength of the steel, $\sigma_u$, is assumed to be 65,000 psi. Moreover, it is assumed that for the typical water depths in which the present invention will ordinarily be used, the effects of the surrounding hydrostatic head are small in comparison to those of the internal flowline pressure. For extremely deep water where the hydrostatic head is greater, the effects of the hydrostatic head should be taken into account in the sizing of components and the like.

In addition, the following terms will be used in their ordinary engineering senses, as follows:

(a) pressure induced axial membrane stress—a pressure induced stress normal to pipe cross sections taken perpendicularly to the longitudinal axis of the pipe. This stress is the pressure end load divided by the cross sectional area of the pipe wall. The pressure end load is the area circumscribed by the ID of the pipe, multiplied by the fluid pressure inside the pipe. The pressure end load is a force physically similar to the force which tends to pop the cork out of a bottle of champagne. For thin-walled tubes, this stress can be stated as $$\sigma_a = \frac{p_i r_m}{2t}$$

where
$p_i$ is the fluid pressure inside the pipe,
$r_m$ is the mean radius of the pipe, and
$t$ is the wall thickness of the pipe. The mean radius and wall thickness of the pipe can be expressed as $$r_m = \frac{D_o + D_i}{4}$$

and $$t = \frac{D_o - D_i}{2}$$

where
$D_o$ is the outside diameter of the pipe, and
$D_i$ is the inside diameter of the pipe.

(b) pressure induced hoop or circumferential membrane stress—a stress resulting from internal pressure, acting normal to cross sections which include the longitudinal axis of the pipe. For thin-walled tubes, this stress is exactly twice the pressure induced axial membrane stress, and will cause the pipe to split longitudinally if it is excessive. This stress can be stated as $$\sigma_h = \frac{p_i r_m}{t}.$$

(c) axial membrane stress induced by external tension—a stress acting normal to cross sections taken perpendicular to the longitudinal axis of the pipe. It is the external, axial load applied to the pipe divided by the cross sectional area of the pipe wall. It adds to the pressure induced axial membrane stress.

(d) maximum stress intensity—the maximum stress resulting from internal pressure, and, for a thin walled tube, is the absolute value of the difference between the pressure induced hoop or circumferential membrane stress and one half of the internal pressure, which may be expressed as $$SI = \sigma_h + p_i/2.$$

It is the maximum stress intensity that is of principal concern in designing a flowline to safely carry a specified internal pressure.

In a flowline 9 having the characteristics and dimensions as first assumed above, $r_m$ is found to be about 3.063 inches, and t is 0.5 inches. The pressure induced hoop membrane stress, $\sigma_h$, is found to be about 30.625 ksi (thousand pounds per square inch); the pressure induced axial membrane stress, $\sigma_a$, is found to be about 15.313 ksi; and the maximum stress intensity, SI, is found to be about 33.125 ksi. It can be seen that a flowline of these dimensions, made of a steel having the assumed physical properties, will safely carry the assumed internal pressure of 5,000 psi, because the maximum stress intensity is less than the assumed yield strength, 35 ksi, of the steel.

In order to determine what the externally applied axial load would have to be to cause this flowline to fail in tension, we first calculate the cross sectional area of the pipe wall, which is stated as $$A_{xs} = \frac{(D_o^2 - D_i^2)\pi}{4}.$$

We find the cross sectional area of the pipe wall to be about 9.621 square inches. Then, we solve for the required externally applied parting load, $F_s$, using the following equation, taking into account (that is, backing out) the pressure end load and the additional component equal to $p_i/2$ contributing to maximum stress intensity, thus:

$$F_S = (\sigma_u - P_i/2) A_{XS} - P_i \pi (D_{inom}^2/4)$$

where $\sigma_u$ is 65 ksi and Dinom, the nominal inside diameter of the pipe for determining pressure end load (which may be thought of as the sealed diameter of the pipe), is 5.625 inches. Solving for $F_S$, we find the required externally applied load to be about 477,000 pounds. This is an excessive load and will normally result in the Christmas tree being damaged before the flowline 9 separates.

Now assume that a fitting 1 having a reduced wall thickness section 17 is incorporated into the flowline 9. Assume also that the reduced wall thickness section 17 has an OD of 6.344 inches, and an ID of 5.906 inches. Fluid inside the pipe is again assumed to be at a pressure of 5,000 psi. The yield point of the steel in reduced wall thickness section 17, $\sigma_y$, is again assumed to be 35,000 psi, and the ultimate strength of the steel, $\sigma_u$, is again assumed to be 65,000 psi.

In a reduced wall thickness section 17 of a fitting 1 having the foregoing dimensions, $r_m$ is found to be about 3.063 inches, which in this particular example is the same as for the flowline 9 discussed above, and t is found to be 0.219 inches. The pressure induced hoop membrane stress, $\sigma_h$, is found to be about 69.92 ksi; the pressure induced axial membrane stress, $\sigma_a$, is found to be about 34.96 ksi; and the maximum stress intensity, SI, is found to be about 72.42 ksi. It can be seen that a fitting 1 having a reduced wall thickness section 17 of these dimensions, made of a steel having the assumed physical properties, will not, without more, carry the assumed internal pressure of 5,000 psi, because the pressure induced hoop stress, and thus the maximum stress intensity, are greater than the assumed yield strength, 35 ksi, and the assumed ultimate strength, 65 ksi, of the steel.

In order to determine what the externally applied axial load would have to be to cause this fitting 1 to fail in tension at the reduced wall thickness section 17, we calculate the cross sectional area of the pipe wall, which again is stated as $$A_{xs} = \frac{(D_o^2 - D_i^2)\pi}{4}$$

and find the cross sectional area of the pipe wall to be about 4.214 square inches. As before, we solve for the required externally applied parting load, $F_s$, using the equation $$F_S = (\sigma_u - P_i/2) A_{XS} - P_i \pi (D_{inom}^2/4)$$

where $\sigma_u$ is again 65 ksi and Dinom, the nominal inside diameter of the pipe for determining pressure end load (again, the sealed diameter of the pipe), is also 5.625 inches, which is the diameter of the normally configured portions of the fitting and the flowline. Solving for $F_s$, we find the required externally applied load to be about 139,100 pounds. At this relatively low externally applied load, the reduced wall thickness section 17 of fitting 1 will fail n tension before any damage can be done to the Christmas tree.

It can be seen, however, that a fitting 1 configured as in the example will fail due to the pressure induced hoop stress alone, so clamp 19 is required in order to limit the pressure induced hoop stress, and the maximum stress intensity, to a magnitude approximately the same as in the normally configured fitting portions in order to maintain the pressure integrity of the fitting in the reduced wall thickness section 17. Through finite element analysis, it is found that the clamp 19, configured substantially as described herein, will so limit the pressure induced hoop stress in the reduced wall thickness section substantially to about the same magnitude as in the normally configured fitting portions.

The clamp 19 may comprise, for example, a split annular member having mating halves 31, 33 which, when placed together, form a substantially continuous, smooth, circular cylindrical inner peripheral surface 35 around reduced wall thickness section 17. Annular surface 35 preferably has a diameter slightly greater than the OD of the reduced wall thickness section 17, such that it fits snugly around the circumference of the reduced wall thickness portion when the fitting 1 is in an unpressured state. Clamp 19 is thus sized generally and preferably with a slight radial clearance between its ID 35 and the OD 37 of the reduced wall thickness portion 17. For the particular dimensions of fitting 1 used in the above example, a radial clearance of between one and two thousandths of an inch, or a diametral difference of twice that amount, is preferred. Thus, for the example set out in detail above, and generally preferably, clamp 19 does not provide any substantial preload on the reduced wall thickness section 17. Because the ID 35 of clamp 19 is preferably shaped so as to form a substantially smooth, continuous, circular cylindrical surface around reduced wall thickness section 17, the clamp preferably provides a uniform circumferential loading around the reduced wall thickness section 17 when the fitting 1 is placed in service and pressured up.

Although for the particular embodiment shown herein a radial clearance for surface 35 with respect to surface 37 of between one and two thousandths of an inch is preferred, in practice the fit of clamp 19 on reduced wall thickness section 17, i.e., the relative dimensions of the two members, may depend on such variables, among others, as the stiffness of the clamp, the sizes of the members, and the materials of which they are made. Accordingly, in any particular case the dimensions and fit of the surface 35 of clamp 19 around surface 37 of reduced wall thickness section 17 may be varied from the preferred embodiment described herein, so long as the desired result of effectively limiting the pressure induced hoop stress in the reduced wall thickness section 17 to about the same magnitude as in the normally configured portions 25, 27 is achieved.

Clamp halves 31, 33 may be secured together and held in place around reduced wall section 17 by fastening means such as bolts 39 and nuts 40, retained in aligned bores in radially extending ears 36 disposed on diametrically opposed sides of the clamp halves. In order to facilitate making the clamp ID 35 of the proper size, the clamp halves 31, 33 may be completed except for the ID bore 35, placed together and bolted shut, and then the ID bore may be cut or machined precisely to the desired dimensions.

It should be understood that clamp 19 could comprise any of a number of different configurations, other than the one shown in the drawings. For example, clamp 19 may comprise a plurality of segments forming an annular member when placed together side by side, with the reduced wall thickness portion 17 being received in the ID of the annular member, and with the segments being held together by a band encircling them around their outer peripheries. Such a band will preferably comprise means for exerting a substantially uniform, radially and inwardly directed force around the segments to hold them in place and provide them with sufficient structural strength and integrity for their intended purpose. Means such as, for example, a tightening screw disposed in a bushing through which the band extends, the screw engaging perforations in the band and advancing the band as the screw is tightened, such as might be found in a hose clamp or the like, may be found suitable. In order to provide the properly dimensioned ID for such a plurality of segments, a procedure analogous to that referred to above in connection with clamp halves 31, 33 might be found suitable. For example, segments having a smaller ID arcuate surface than desired may be fitted side by side and banded together, and then the ID surface 35 machined or otherwise cut or shaped to its desired dimensions. Alternatively, clamp 19 may simply comprise two split band halves welded together. It will no doubt be appreciated that there are many different types, styles, and shapes of clamps which could be used for clamp 19.

As shown particularly in FIG. 4, it is preferred that gradually tapered or frustoconical transition surfaces 41 are disposed between the normally configured portions 25, 27 and the reduced wall thickness section 17 on both the OD and the ID of the fitting, on both ends of the reduced wall thickness section, that is, on the end toward the Christmas tree 11 and on the end toward the remainder of the flowline 9. The transition surfaces between the gradually tapered portions 41 and the reduced wall thickness section 17 comprise small radii, indicated at 45. The small radii, which typically may have a value of about one-quarter inch, eliminate sharp corners between the tapered surfaces 41 and the reduced wall thickness section 17.

The axial length of the clamp 19 preferably covers approximately the distance between the tangent points between the small radii surfaces 45 and the reduced wall thickness section 17. For the example discussed above, the cross section of clamp 19 is approximately two inches square. Such dimensions are given as exemplary only, and are not limiting. It should be understood that the cross sectional dimensions of the clamp 19 must be selected in any particular case in order to accomplish the intended result of the clamp, that is, to limit the pressure induced hoop membrane stress in reduced wall thickness section 17 to about the same value as in the adjacent normally configured fitting portions 25, 27. Accordingly, other dimensions and configurations of the clamp cross section will be found suitable for use in the present invention.

Referring to FIGS. 3 and 4, the fitting I of the present invention preferably includes a frame 51 with supports 53 disposed on opposite sides of the reduced wall thickness section 17 with reinforcing members 5 connected between the supports 53 prior to placing the fitting in service. Supports 53 may comprise radially outwardly extending circular flange plates 57, with each such flange plate 57 having a tapering base portion 59 disposed between its radially inner peripheral face and the adjacent OD surface of portions 25, 27 of fitting 1. Reinforcing members 55 may comprise a plurality of circumferentially spaced apart, longitudinally axially extending rods disposed in axially extending bores in the flange plates, the bores in one flange plate being in circumferential register with corresponding bores in the other flange plate such that the rods are disposed substantially parallel to the axis of fitting 1. Rods 55 have threads at least on their end portions for receiving nuts 61 disposed on each side of each flange plate 57. Nuts 61 may be tightened against the respective faces of the flange plates 57 so as to rigidly support the portions 17, 25, 27 axially together and in coaxial alignment with one another, supporting the fitting 1 against prematurely bending or breaking from axial loads or bending moments applied to the fitting while it is being installed or transported. Thus the reinforcing members 55 provide additional, temporary structural support for the reduced wall thickness section 17, and prevent it from being so damaged during transit or installation. The nuts 61 and rods 55 are removed after installing the fitting 1 in the flowline 9 and prior to placing the fitting in service, thereby "arming" the fitting to separate at the predetermined externally applied load.

The fitting 1 preferably has annular tapering surfaces 65 on its ends such that the fitting may be, for example, welded to the Christmas tree 11 on one end and to the adjacent end of the flowline 9 on its other end.

Thus, it will be appreciated that the break-away flowline fitting 1 of the present invention will separate axially, at the reduced wall thickness section 17, at a much lower externally applied axial load and/or bending moment than what would otherwise be required to break the fitting at its normally configured portions 25, 27. As an example only, and not by way of limitation, fitting 1 may be designed to separate axially at an externally applied load of the order of 150,000 pounds. At such a low level of externally applied load, the fitting 1 will separate axially before any harm or damage can be done to the Christmas tree 11. Thus, the tree 11 is protected from being pulled over or damaged by such externally applied loads. At the same time, the clamp 19 limits the pressure induced hoop membrane stress in the reduced wall thickness section 17 to about its value in the normally configured portions 25, 27 of the fitting, so the fitting retains substantially all of the pressure-carrying capacity of the flowline as a whole. The fitting thus effectively protects the tree 11, without sacrificing the pressure integrity of the fitting and, thus, the flowline.

While preferred and alternative embodiments of the invention have been shown and described, many modifications thereof may be made by those skilled in the art without departing from the spirit of the invention. Therefore, the scope of the invention should be determined in accordance with the following claims.

We claim:

1. A break-away fitting for a flowline in fluid communication with a subsea Christmas tree for protecting the tree from external axial loads applied to the flowline form an outboard locations, comprising:
    a tubular body having a reduced wall thickness section disposed at a preselected location along its length, said reduced wall thickness section being sized to fail in tension at a predetermined low level of such external axial load, such low level of external axial load being less than that which would tilt or damage the tree;
    pressure-containing walls forming the remainder of said tubular body and extending from said reduced wall thickness section to the opposite ends of said tubular body, said pressure-containing walls being sized to contain the internal fluid pressures expected in service; and
    annular clamp means disposed around and engageable with said reduced wall thickness section for limiting the pressure induced hoop membrane stress in said reduced wall thickness section resulting from such internal fluid pressures to a magnitude less than the yield stress of the material of which said reduced wall thickness section is made, said reduced wall thickness section of said tubular body including a midportion having a substantially uniform thickness, and tapering transition surfaces disposed between said midportion and said pressure-containing walls on the outer diameter and the inner diameter surfaces of said tubular body, said midportion comprising the area of said fitting sized for such failure in tension.

2. A break-away fitting according to claim 1, wherein said reduced wall thickness section of said tubular body is integral with said pressure-containing walls.

3. A break-away fitting according to claim 1, wherein said annular clamp means limits such pressure induced hoop membrane stress in said reduced wall thickness section during service to about the same magnitude as that in said pressure-containing walls.

4. A break-away fitting according to claim 1, wherein said midportion of said reduced wall thickness section is substantially circular cylindrical in configuration, and said tapering transition surfaces comprise frustoconical surfaces.

5. A break-away fitting according to claim 1, wherein said clamp means comprises annular retaining means for exerting a substantially circumferentially uniform load around said midportion of said reduced wall thickness section when said fitting is pressured up.

6. A break-away fitting according to claim 5, wherein said annular retaining means has substantially the same axial length as said midportion of said reduced wall thickness section.

7. A break-away fitting according to claim 6, wherein the inner diameter surface of said annular retaining means and the outer diameter surface of said midportion of said reduced wall thickness section have a radial clearance therebetween when said fitting is unpressured.

8. A break-away fitting according to claim 1, wherein the radial distance between the outer diameter surface of said midportion of said reduced wall thickness section and the outer diameter surfaces of said pressure-containing walls is substantially the same as the radial distance between the inner diameter surface of said reduced wall thickness section and the inner diameter surfaces of said pressure-containing walls.

9. A break-away fitting according to claim 1, wherein one end of said tubular body is adapted for connection to the Christmas tree, and the other end of said tubular body is adapted for connection to the adjacent end of the flowline.

10. A break-away fitting for a flowline in fluid communication with a subsea Christmas tree for protecting the tree from external axial loads applied to the flowline from an outboard location, comprising:

a tubular body having a reduced wall thickness section disposed at a preselected location along its length, said reduced wall thickness section being sized to fail in tension at a predetermined low level of such external axial load, such low level of external axial load being less than that which would tilt or damage the tree;

pressure-containing walls forming the remainder of said tubular body and extending from said reduced wall thickness section to the opposite ends of said tubular body, said pressure-containing walls being sized to contain the internal fluid pressures expected in service;

annular clamp means disposed around and engageable with said reduced wall thickness section for limiting the pressure induced hoop membrane stress in said reduced wall thickness section resulting from such internal fluid pressures to a magnitude less than the yield stress of the material of which said reduced wall thickness section is made; and frame means disposed on said pressure-containing walls and spanning said reduced wall thickness section for holding said reduced wall thickness section and said pressure-containing walls axially together and in axial alignment with one another prior to placing the fitting in service, said frame means including a first support member disposed on one of the pressure-containing walls on one side of said reduced wall thickness section and a second support member disposed on the other pressure-containing wall on the other side of said reduced wall thickness section; and a plurality of reinforcing members circumferentially spaced around said tubular body, said reinforcing members being releasably mounted on and extending between said support members.

* * * * *